O. W. NOBLE.
Heating-Stove.

No. 225,484. Patented Mar. 16, 1880.

Witnesses
W. J. Cambridge
Edward E. Petter

Inventor,
Oscar W. Noble
per P. Teschemacher
Atty

UNITED STATES PATENT OFFICE.

OSCAR W. NOBLE, OF WAKEFIELD, MASSACHUSETTS, ASSIGNOR TO HIMSELF AND DANIEL GOSS, OF SAME PLACE.

HEATING-STOVE.

SPECIFICATION forming part of Letters Patent No. 225,484, dated March 16, 1880.

Application filed January 22, 1880.

*To all whom it may concern:*

Be it known that I, OSCAR W. NOBLE, of Wakefield, in the county of Middlesex and State of Massachusetts, have invented an Improvement in Heating-Stoves, of which the following is a full, clear, and exact description, reference being had to the accompanying drawings, making part of this specification, in which—

Figure 1:
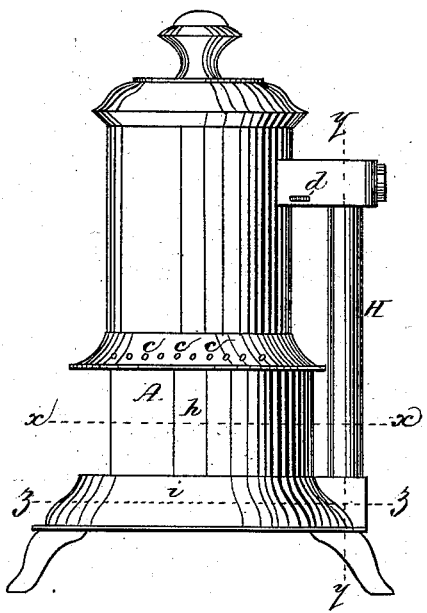
Figure 2:
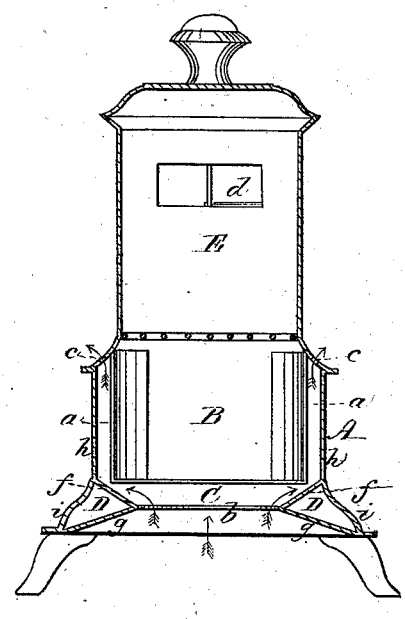
Figure 3:
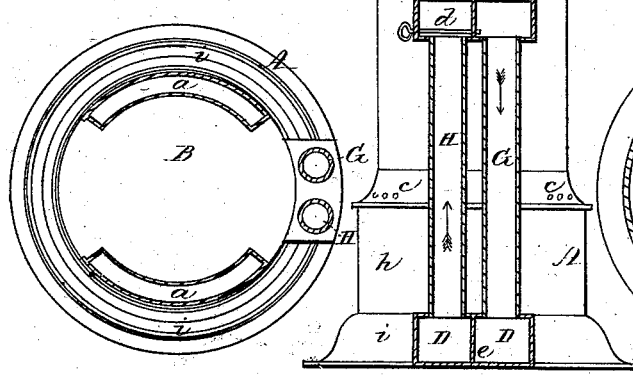
Figure 4:
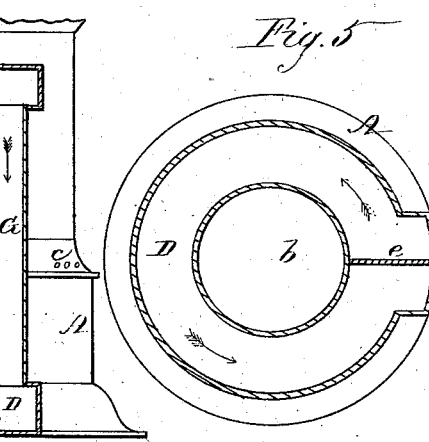
Figure 5:
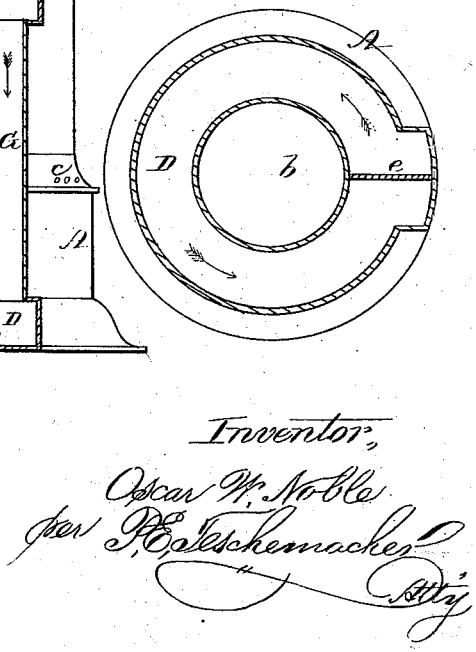

Figure 1 is a side elevation of a heating-stove constructed in accordance with my invention. Fig. 2 is a vertical section through the center of the same. Fig. 3 is a horizontal section on the line $x\,x$ of Fig. 1. Fig. 4 is a vertical section on the line $y\,y$ of Fig. 1. Fig. 5 is a horizontal section on the line $z\,z$ of Fig. 1.

My invention relates to an improvement in heating-stoves, and has for its object to utilize the heat to the greatest possible extent, thereby economizing fuel; and it consists in a stove provided at its bottom with a hot-air chamber, communicating with the external air near the floor through an opening in the bottom of the stove, and with an air flue or flues formed within the walls of the ash-pit, and having outlet-apertures for the escape of the heated air, in combination with a flue extending entirely around the bottom of the base, through which the heat and products of combustion are caused to pass to the chimney, the inner sides of this latter flue being of such form as to present the greatest possible area of radiating-surface for the purpose of rapidly heating the upward currents of cold air which enter the opening in the bottom of the stove, these currents of air passing up into the hot-air chamber and into contact with the sides of the heating-flue, and thence into the air flue or flues in the walls of the ash-pit, whence they escape in an intensely-heated condition from the outlet-apertures into the apartment.

To enable others skilled in the art to understand and use my invention, I will proceed to describe the manner in which I have carried it out.

In the said drawings, A represents the base of a heating-stove, in which is formed the ash-pit B, the walls of which, on each side, are made double, forming air flues or passages $a\,a$, which open at the bottom into an air-chamber, C, which communicates with the external air near the floor through a central opening, $b$, in the bottom of the stove, the air-flues $a$ being provided at the top with a series of outlet-apertures, $c$, for the escape of the heated air into the apartment. These outlet-apertures $c$, instead of being at the top of the flues $a$, may be made in the sides thereof, at any desired height, if preferred.

Extending entirely around the bottom of the base A is a flue, D, through which the hot air and products of combustion are caused to pass to the chimney when the damper $d$ is closed, the hot air and gases passing from the combustion-chamber E down the descending pipe or flue G, and through the flue D to the ascending pipe or flue H, up which they pass to the chimney, the flue D being provided with a partition, $e$, at the rear, which compels the heat and gases to pass entirely around it, as required, the heat being thus absorbed by the sides of the flue D, so that a comparatively small amount is allowed to pass up the chimney to waste. The flue D approximates to a triangle in cross-section, the inner sides, $f\,g$, extending out into the hot-air chamber C and affording an extended area of radiating-surface, which thus rapidly heats the upward currents of cold external air, which are taken from near the floor of the apartment in which the stove is placed, these currents of air entering the opening $b$ at the bottom of the stove and passing up into the chamber C into contact with the flue D, and thence up into the air-flues $a\,a$, from which they escape in a highly-heated condition from the outlet-apertures $c$ into the apartment, which is also additionally heated by the radiation from the outer sides, $h\,i$, of the flues $a$ D.

By thus utilizing the radiation from the inner sides of the flue D to heat currents of external air, which are admitted at the bottom of the stove and afterward allowed to escape in a heated condition into the apartment, I am enabled to reduce the waste or loss of heat to a minimum, and with this construction and arrangement of flues very little heat is allowed to pass to the chimney, and consequently the fuel is economized to the greatest possible extent, and the heating capabilities of the stove are greatly increased.

When the fire is first started the damper $d$ is opened, which allows the smoke to pass directly to the chimney, as usual, instead of down the pipe G to the flue D.

The angular sides $f\ g$ of the flue D may, if desired, be made corrugated, so as to still further increase the area of radiating-surface, and this flue D, instead of being made angular in cross-section, may be of other form, if desired.

What I claim as my invention, and desire to secure by Letters Patent, is—

In a heating-stove, the base A, provided at its bottom with an opening, $b$, for the admission of the external air, a chamber, C, and an air flue or flues, $a$, in communication therewith and with the opening $b$, and having outlet-apertures $c$ for the escape of the heated air, in combination with a flue, D, extending entirely around the bottom of the base A, through which the heat and products of combustion are caused to pass for the purpose of heating the upward currents of air which enter the opening $b$ and escape through the outlet-apertures $c$, substantially as described.

Witness my hand this 13th day of January, A. D. 1880.

OSCAR W. NOBLE.

In presence of—
P. E. TESCHEMACHER,
W. J. CAMBRIDGE.